(12) United States Patent
Groitl

(10) Patent No.: US 7,014,037 B2
(45) Date of Patent: Mar. 21, 2006

(54) CONVEYING DEVICE FOR CONVEYING WORKPIECES

(75) Inventor: Werner Groitl, Stetten (DE)

(73) Assignee: Grob-Werke Burkhart Grob e.K., Mindelheim (DE)

( * ) Notice: Subject to any disclaimer, the term of this patent is extended or adjusted under 35 U.S.C. 154(b) by 11 days.

(21) Appl. No.: 10/648,240

(22) Filed: Aug. 27, 2003

(65) Prior Publication Data

US 2005/0006207 A1    Jan. 13, 2005

(30) Foreign Application Priority Data

Aug. 30, 2002   (DE) .............................. 102 40 794

(51) Int. Cl.
    *B65G 13/06* (2006.01)
(52) U.S. Cl. ...................... 198/781.07; 198/781.11; 198/791
(58) Field of Classification Search ........... 198/781.07, 198/781.11, 791
    See application file for complete search history.

(56) References Cited

U.S. PATENT DOCUMENTS

| | | | |
|---|---|---|---|
| 3,513,960 A | * | 5/1970 | Adams .................. 198/781.05 |
| 3,667,589 A | | 6/1972 | Constable ................... 198/127 |
| 4,015,706 A | * | 4/1977 | Goffredo et al. ............ 198/791 |
| 4,108,303 A | * | 8/1978 | Vogt et al. ............. 198/781.06 |
| 4,488,638 A | * | 12/1984 | Morgan et al. ........ 198/781.06 |
| 4,572,353 A | | 2/1986 | Felder ........................ 198/577 |
| 4,819,788 A | * | 4/1989 | Van Der Schie ....... 198/781.06 |
| 4,951,808 A | * | 8/1990 | Collins et al. ......... 198/781.05 |
| 5,168,979 A | * | 12/1992 | Iversen .................. 198/781.07 |
| 5,485,911 A | * | 1/1996 | Kettelson et al. ........... 198/791 |
| 6,460,690 B1 | * | 10/2002 | Tachibana et al. .......... 198/791 |

FOREIGN PATENT DOCUMENTS

| | | |
|---|---|---|
| DE | 4002414 A1 | 8/1991 |
| DE | 19826627 A1 | 12/1999 |
| EP | 0199045 A2 | 10/1986 |
| FR | 2540841 | 8/1984 |
| GB | 2286572 A | 8/1995 |

* cited by examiner

*Primary Examiner*—James R. Bidwell
(74) *Attorney, Agent, or Firm*—Jacobson Holman PLLC

(57) ABSTRACT

A conveying device for conveying workpieces, for example in a production line, the conveying device including at least one driving line divided into several sections, and each section being able to convey workpieces independently from other sections. At least one central drive is provided which drives the section for a conveying of the workpieces via a coupling.

16 Claims, 2 Drawing Sheets

CONVEYING DEVICE FOR CONVEYING WORKPIECES

Figure 1:
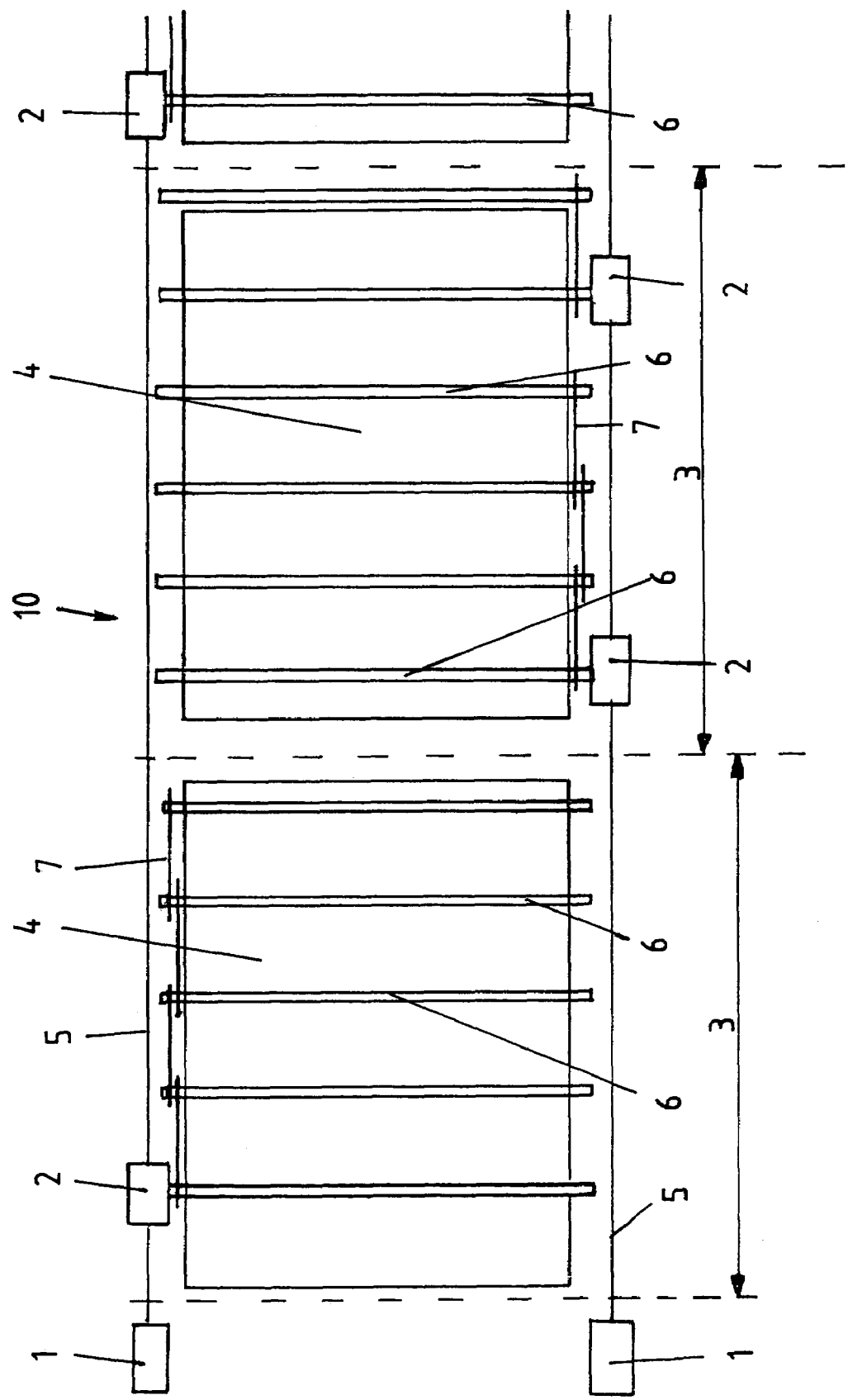

The invention refers to a conveying device for conveying workpieces, for example in a production line, the conveying device comprising at least one driving line divided into several sections, and each section being able independently from other sections to convey workpieces.

BACKGROUND OF THE INVENTION

For conveying workpieces, for example in transfer lines, respectively production lines, conveying devices are provided. Here the workpieces are conveyed in the direction of the production sequence on a driving line designed, for example, as a roller conveyor. The driving line is divided into sections so that the advance of the workpieces can be influenced section by section. If, for example, the driving line is designed as roller conveyor, the rollers, respectively simultaneously several rollers in a section, are driven by corresponding drives. For that purpose a plurality of back-geared motors is provided. These can be switched on and off. It is often an object that a workpiece positioned in a section can be controlled consciously, resulting in a very large number of back-geared motors when, for example, small workpieces are conveyed. This may lead to space problems, as the drives have to be arranged because of their plurality, if necessary, on both sides next to the roller conveyor. By means of that also the access at the belt itself is impeded. These handicaps in the accessibility disturb in particular the feeding or removal of workpieces. Also the construction space for the necessary guides for the workpiece and holding devices with sensory mechanism, which may be provided, is considerably limited. The overall technical effort becomes very large altogether because of the high number of back-geared motors, their cabling and control.

In the solution according to the citation DE 40 02 414 A1 the conveying device is divided into different sections. The production line here has a conveyor road where workpieces, for example workpieces clamped on workpiece carriers, are conveyed with identical speed from one production station and one production area to the other.

The solution according to the citation DE 40 02 414 A1 suggests assigning an additional conveyor to the production station, respectively several production stations of the production line. This additional conveyor has another construction than the conveyor road itself. It connects the production stations of the production area following one another at a distance and extends in addition to that over a feeding road arranged in front of the first production station seen in the conveying direction and a removing road attached to the last production station. The additional conveyor has essentially only a longish means of drawing which can move back and forth in the direction of the conveying. The conveying road, which is furthermore continues over the region of the additional conveyor, namely the friction roller conveyor, which is not driven in this region, serves as a means for carrying for the additional conveyor. In this region of the conveying road the drawing means of the additional conveyor takes over the drive for these parts. A stationary driving unit driving the connecting rod via a pinion is provided for this additional drive which may, for example, drive workpieces, respectively workpiece carriers, in several sections. The connecting rod engages via couplings which are formed like claws into the workpiece carriers and therefore drives them for the movement on the conveying road.

Coming from the state of the art described above it is an object of the invention to provide a conveying device where the effort for the corresponding conveying system is clearly reduced.

BRIEF SUMMARY OF THE INVENTION

According to the invention this problem is solved by means of a conveying device for conveying workpieces, for example in a production line, the conveying device comprising at least one driving line divided into several sections and each section being able independently from other sections to convey workpieces which is characterised by the fact that at least one central drive is provided which drives via a coupling the section for conveying the workpieces. According to the invention therefore it is proposed to provide a lot of couplings instead of a large number of back-geared motors. The effort for producing couplings is clearly smaller. In addition to that they need less space and in particular the effort for the cabling, respectively the controls, are clearly reduced. According to the invention thus only one drive motor for several zones is necessary. Therefore the effort on the electronic side is considerably reduced. Also the construction size of the couplings is smaller than the previously used back-geared motors so that also the access of the conveying device for feeding, respectively removing, workpieces is essentially improved.

The solution according to the citation DE 40 02 414 A1 needs at least two different drives, namely one for the drive of the conveying line, for example a shaft drive, and a second one for the drive of the additional conveyor which drives the workpieces, respectively the workpiece carriers, via a connecting rod by means of couplings designed claw-like when the couplings are engaged with the workpieces, respectively with the workpiece carriers. Therefore a number of drives is needed, namely at least one per machining station. This solution is very expensive. In addition to that it does not enable the conveying of workpieces with different speeds on the individual sections because all couplings drive the workpieces, respectively the workpiece carriers, via the same connecting rod. The effort for equipping the conveying line with an additional conveyor, as it is described in the citation DE 40 02 414 A1 is considerable and the couplings which are designed claw-like are, in addition to that that, prone to disturbances and need a lot of maintenance because of a high wear which occurs during the engagement of the couplings into the workpiece carriers.

The arrangement according to the invention reduces the number of different components extremely. The conveying device within the section as well as the feeding roads can basically be designed identically. By means of that one central drive manages to drive basically the complete conveying device and moves the workpieces in different sections with different speeds at different times.

In a preferred embodiment of the invention it is provided that the driving line of at least a first section is essentially designed identically as the driving line of a second section and/or the driving line connecting the section is essentially identically with the driving line in the section. By means of this development according to the invention it is achieved that the effort for the conveying system is clearly reduced as a high number of standardised parts can be used. However, the idea according to the invention is not only limited to this variant, also other conveying concepts working similarly can be connected to each other in the sense of the invention.

According to an advantageous development of the invention it is provided that the section or driving line, respectively driving lines of the section, is/are designed as roller conveyor. The individual rollers of the roller conveyor are here connected with the central drive via couplings, which makes possible a conveying of workpieces part-by-part or section-by-section. Even if in the following a driven section is mentioned it has to be understood that this is the driving line of the respective section.

According to an advantageous development of the invention two central drives are provided which are arranged on both sides of the driving line. This solution makes it possible to arrange in the construction a high number of couplings along the total driving line increasing the flexibility of the conveying device altogether considerably. Because of this solution considerably more sections, respectively rollers, can be controlled very differently.

Another aspect of the invention results from the fact that a continuous drive shaft or several drive shafts each driving several sections form the central drive. This solution is very advantageous in so far as, because of a single driving drive shaft arranged on one side, a plurality of couplings can be arranged along the driving line. In order to prevent the total length of the continuous drive shaft from becoming to long altogether because of the size of the production lines, several drive shafts are provided each of which driving several sections.

According to the invention it has also been found that it is an advantage when the couplings for deriving, respectively transferring, of the turning moment from the drive shafts via a spur gear are connected with the roller(s) of the roller conveyors of the respective sections.

It has also been found to be an advantage when chain drives are provided in the respective section(s) which transfer the turning moment via toothed wheels and chains from the couplings to the rollers of the roller conveyors.

It is an advantage here when the rollers of the roller conveyor in the individual sections are connected to each other by means of chain drives without slip, respectively with little slip.

Another embodiment of the solution according to the invention provides that at least one of the sections is deigned that it can be switched on, respectively off.

Advantageously another embodiment of the invention is characterised by the fact that at least one of the rollers of the roller conveyor in the respective section is designed that it can be switched on, respectively off.

According to an advantageous development the conveying device is characterised by the fact that at least one of the couplings can be switched on, respectively off. By means of that the flexibility of the complete conveying device altogether is further increased because also within a certain region, respectively section, it can be engaged, respectively disengaged.

It is a particular advantage here when the couplings are controlled magnetic, electromagnetic, mechanic, pneumatic and/or hydraulic. All forms of control of the couplings are possible and can be selected freely according to the purpose of use.

It has also been found that it is an advantage when the size of the coupling is adapted to the size of the chain drive. By means of that the required space altogether can be reduced further which contributes to a further improvement of the access to the conveying device in order to feed workpieces to the driving line, respectively to remove the workpieces.

A further development of the conveying device according to the invention is characterised by the fact that several couplings are provided within one section. This also contributes to the flexibility of the complete conveying device.

According to a development of the conveying device according to the invention the coupling comprises a stationary clutch disc, a clutch disc which can move longitudinally in the direction of the drive shaft as well as the coupling housing.

According to the invention it has been found to be an advantage when lateral coverings of the driving line are provided and the couplings are arranged in the lateral covering(s) of the driving line.

Furthermore it is an advantage when several couplings are provided within one section.

Another aspect of the invention is given by the fact that the couplings are formed by a stationary clutch disc, a clutch disc which can move longitudinally in the direction of the drive shaft as well as the coupling housing.

It has also turned out to be advantageous when for the drive of the roller conveyor a spur gear is provided which comprises a spur wheel and a pinion.

The invention also refers to a production line with a conveying device according to one or more of the embodiments described before.

BRIEF DESCRIPTION OF THE DIFFERENT VIEWS

Figure 2:
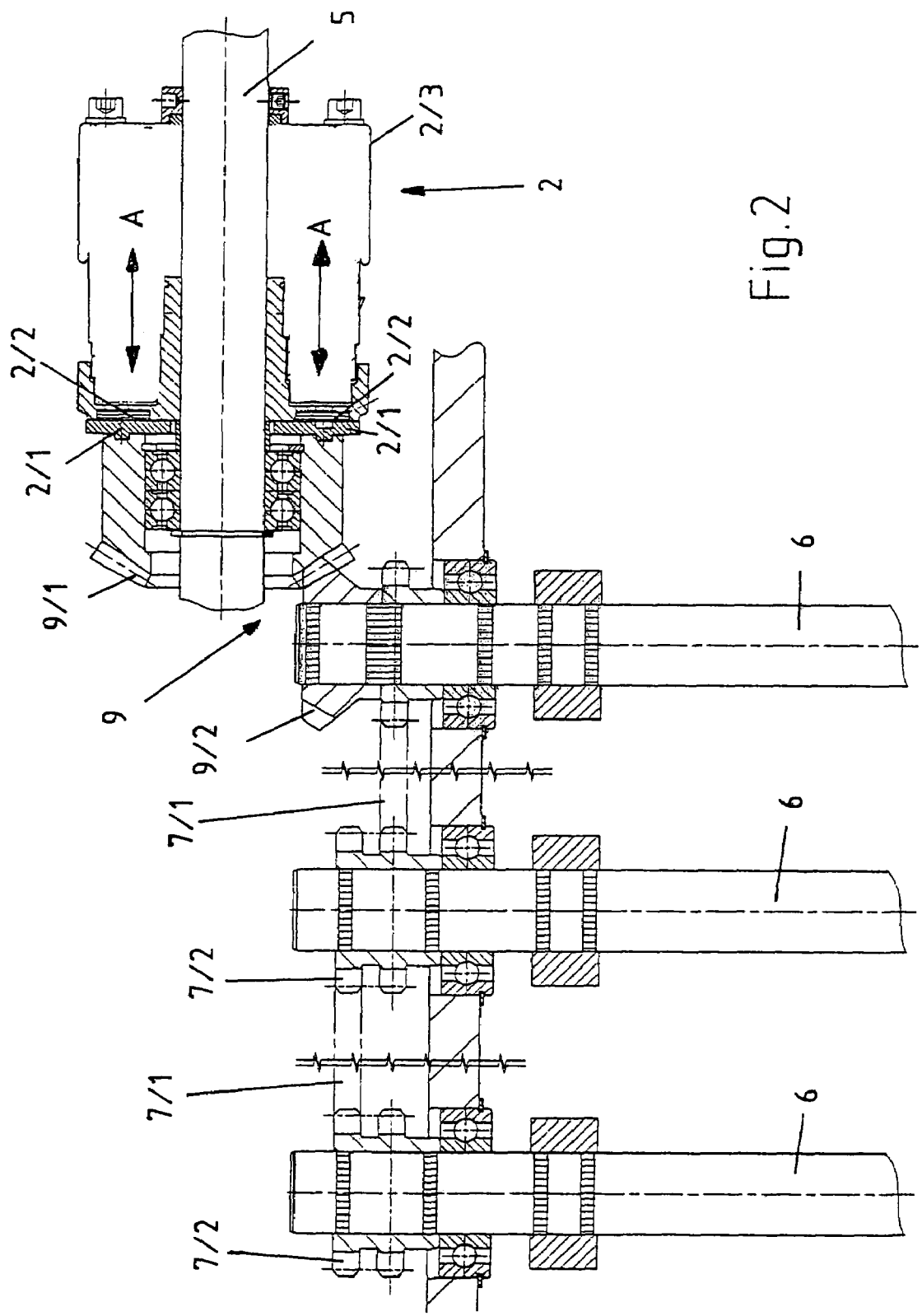

The invention will be described in the following by means of examples and drawings furthermore. In the drawings:

FIG. 1 a view from the top of a conveying device according to the invention,

FIG. 2 coupling with three rollers engaged to each other in one section, respectively driving line.

DETAILED DESCRIPTION OF THE PREFERRED EMBODIMENT

FIG. 1 shows a top view of a driving line 10 designed as a roller conveyor of the conveying device according to the invention. On both sides of the driving line central drives 1 are arranged which drive via a drive shaft 5 the respective sections 3 of the driving line 10 designed as a roller conveyor. Reference number 2 indicates here the couplings which are arranged alternating along the driving line 10 in the embodiment according to FIG. 2. Reference number 3 indicates here the sections of the roller conveyor which can be controlled section by section by the central drive 1 via the coupling 2. The sections 3 are only shown schematically with dashed lines. On the rollers 6 of the roller conveyor here the workpieces 4 are positioned. The workpieces 4 can also be arranged on pallets when this seems useful according to the size of the respective workpiece. The individual rollers 6 of the roller conveyor are connected to each other via chain drives 7. Along the driving line here couplings 2 are provided in the direction of conveying which can each drive several rollers 6 of one section simultaneously. Within the section 3, which is located on the right hand side in the drawing, two couplings 2 are provided which make a further conveying, also gradually, within the section 3 possible.

Of course the complete driving line 10 as well as their sections 3 are designed in such a way that the drive can also be carried out reversibly in the opposite direction.

By means of the arrangement of at least one coupling 2 for each section 3 along the driving line 10 it is now possible to keep the effort in respect of the engineering for the conveying device according to the invention considerably lower than it was possible with the back-geared motors known up to now. It is also very clear that the access along the driving line for feeding workpieces 4, respectively for removing them, is essentially improved. Couplings 2 are adapted in their size in such a way that they fit into the lateral coverings along the driving line, making a further improvement of the driving line possible. In particular the couplings as well as the chain drives 7 within the individual sections 3 are protected by that against damages and against soiling, respectively wetting with coolants. The coverings, which can be arranged on both sides of the driving line, are not drawn in the FIG. 1 for a better understanding of the invention.

In FIG. 2 a detailed section of a part of the section 3, respectively the driving line, is shown. The reference number is assigned the continues drive shaft as in FIG. 1. On the drive shaft 5 here the coupling 2 is arranged. Reference number 2/1 indicates the stationary clutch disc, reference number 2/2 indicates the movable clutch disc. The movable clutch disc 2/2 can move here longitudinally along the drive shaft 5, so that it can move in the direction of the arrow A for engaging, respectively disengaging. The details for the control of the clutch disc 2/2 are not shown here as there is a plurality of technical opportunities which can be used for engaging the clutch disc 2/2.

These are, for example, mechanic, magnetic, electromagnetic, hydraulic and/or pneumatic control opportunities.

Reference number 2/3 indicates the coupling box. The coupling 2 is connected with a roller 6 of the roller conveyor via a spur gear 9. Here a pinion 9/2 located on the roller 6 of the roller conveyor engages into the spur wheel 9/1 of the coupling. In the engaged position the turning moment is transferred by means of that from the drive shaft 5 via the clutch discs 2/1 and 2/2 and the spur gear 9 with the spur wheel 9/1 and the pinion 9/2 to the roller 6 of the roller conveyor.

Via a chain drive 7 formed by the chain 7/1 and the toothed wheel 7/2 the turning moment is transferred from the roller 6 of the roller conveyor on the right hand side in the FIG. 2 to other rollers 6 arranged on the left hand side of this roller 6 of the roller conveyor, respectively the driving line. The chain drive 7 is designed here in such a way that the transfer of the turning moment is possible without slip, respectively with little slip. In the drawing of FIG. 2 it is evident that the transfer of the turning moment from the drive shaft 5 via couplings 5 and chain drives 7 to the rollers 6 of the roller conveyor reduces the effort for driving lines of this kind, respectively for sections of the driving line, considerably. The size of the construction altogether is essentially smaller than it is possible, for example, with back-geared motors. Also the engineering effort for controlling the couplings is considerably smaller than the one for the drive of back-geared motors. Therefore also the effort for engineering and controlling altogether is reduced essentially.

In the drawing conveying devices are shown which have a continuos drive shaft 6. However, the application is not limited to that, the concept according to the invention is also possible in the same way with rollers which are supported only on one side and therefore can move freely. These rollers are, on the other hand, also in a corresponding carrying frame and allow a suspended conveying of the workpiece on the conveying line between the two wheels. If necessary here also one or both rollers are driven. This leads to the preferred embodiment of the invention in such a way that the driving line has two frames extending longitudinally, each frame has a roller conveyor and at least one frame carries a roller conveyor which can be driven. Of course in this variant of the invention each frame has an independent roller conveyor, the axles of the rollers extending parallel, if necessary, however, the rollers, however, not having a common shaft.

Although the invention has been described by exact examples which are illustrated in the most extensive detail, it is pointed out that this serves only for illustration and that the invention is not necessarily limited to it because alternative embodiments and methods become clear for experts in view of the disclosure. Accordingly changes can be considered which can be made without departing from the contents of the described invention.

What is claimed is:

1. Conveying device for conveying workpieces in a production line, the conveying device comprising
   a driving line divided into several sections and the driving line of each section being able independently from the other sections to convey workpieces,
   a central drive driving, via a plurality of couplings, the driving line of the sections for a conveying of the workpieces, and
   a continuous drive shaft driving several of said sections via the respective ones of the plurality of couplings for a conveying of the workpieces, and
   the couplings each being formed by a coupling housing, a stationary coupling disc and a movable coupling disc movable longitudinally in a direction of the continuous drive shaft for engaging, as well as respectively disengaging, the stationary coupling disc so as to independently drive the several sections.

2. Conveying device according to claim 1, wherein the driving line of at least a first section is at least one of designed essentially identically with the driving line of a second section and the driving line connecting the sections is essentially identical with the driving line in the section.

3. Conveying device according to claim 1, wherein the driving line is a roller conveyor which is driven.

4. Conveying device according to claim 1, wherein two central drives are provided.

5. Conveying device according to claim 4, wherein the two central drives are arranged on both sides of the driving line.

6. Conveying device according to claim 1, wherein at least one spur gear is provided, the driving line is a roller conveyor which is driven and the couplings are connected with at least one roller of the roller conveyors of respective sections by the spur gear.

7. Conveying device according to claim 1, wherein chain drives are provided in the respective sections which transfer a turning moment via toothed wheels and chains from the couplings to rollers of the driving line.

8. Conveying device according to claim 7, wherein the rollers of the driving line are driven and are connected to each other in the individual sections by the chain drives with minimal slip.

9. Conveying device according to claim 1, wherein at least one of the sections is designed in such a way that the at least one section is one of switched on, switched off, and the sections driven independently from each other.

10. Conveying device according to claim 7, wherein at least one of the rollers of the driving line in the respective section is designed in such a way that it is one of switched on and switched off.

11. Conveying device according to claim 1, wherein at least one of the couplings is designed in such a way that the at least one coupling is at least one of switched on, switched off, and controlled by at least one of a magnetic, electromagnetic, mechanical, pneumatic and hydraulic circuit.

12. Conveying device according to claim 1, wherein a chain drive is provided and a size of the coupling is adapted to a size of the chain drive.

13. Conveying device according to claim 1, wherein the couplings are formed by a stationary clutch disc, a clutch disc moving longitudinally in a direction of a drive shaft as well as a coupling housing.

14. Conveying device according to claim 1, wherein the drive of the driving line includes a roller conveyor driven by a spur gear including a spur wheel and a pinion.

15. Conveying device according to claim 1, wherein the driving line has two longitudinal frameworks, each framework has at least one of a roller conveyor of the driving line and at least one framework carrying a driven roller conveyor.

16. Production line with the conveying device according to claim 1.

* * * * *